United States Patent [19]
Hurst

[11] Patent Number: 5,836,422
[45] Date of Patent: Nov. 17, 1998

[54] SHOPPING CART HAVING FRONT BASKET WALL WITH LOWERED UPPER EDGE AND COMBINATION WITH CHECKOUT STAND

[75] Inventor: Jack W. Hurst, Wagoner, Okla.

[73] Assignee: Unarco LLC, Atlanta, Ga.

[21] Appl. No.: 658,203

[22] Filed: Jun. 4, 1996

[51] Int. Cl.[6] .................................................. A47B 46/00
[52] U.S. Cl. ...................................... 186/63; 280/33.991
[58] Field of Search ......................... 280/33.991, 33.992, 280/33.994, 33.995, 33.996, 33.997, 33.998; 186/62, 63, 64, 65

[56] References Cited

U.S. PATENT DOCUMENTS

| | | | |
|---|---|---|---|
| D. 368,564 | 4/1996 | Trubiano | D34/19 |
| 2,943,707 | 7/1960 | Ramlose | 280/33.995 |
| 3,039,564 | 6/1962 | Shaukis | 186/62 |
| 3,083,791 | 4/1963 | Shoffner | 280/33.995 |
| 3,297,108 | 1/1967 | Davis | 186/63 |
| 3,335,818 | 8/1967 | Thompson | 186/63 |
| 4,353,564 | 10/1982 | Joseloff | 280/33.995 |
| 4,373,611 | 2/1983 | Frederick | 186/64 |
| 5,027,924 | 7/1991 | Gutmann | 186/62 |

FOREIGN PATENT DOCUMENTS

| | | | |
|---|---|---|---|
| 940961 | 4/1971 | Canada . | |
| 2642718 | 8/1990 | France | 280/33.995 |
| 3238091 | 7/1984 | Germany | 280/33.994 |
| 3633140 A1 | 3/1988 | Germany . | |
| 1196954 | 7/1965 | United Kingdom | 280/33.995 |
| 2268134 | 1/1994 | United Kingdom | 280/304.1 |

*Primary Examiner*—Thomas J. Brahan
*Attorney, Agent, or Firm*—Rockey, Milnamow & Katz, Ltd.

[57] ABSTRACT

A checkout stand supported by a floor has a working surface at a specific elevation above the floor and is combined with a shopping cart comprising a wheeled chassis, a handle structure, and a basket having side, bottom, and front walls, which are fixed to one another. The upper edges of the side walls are parallel to each other and slope downwardly toward the front wall. Being spaced at least several inches below the upper edges of the side walls, the upper edge of a central region of the front wall is located approximately at the same elevation above the floor. Each of two side regions of the front wall has a stepped edge between the upper edge of one of the side regions and the upper edge of the central region of the front panel.

9 Claims, 2 Drawing Sheets

SHOPPING CART HAVING FRONT BASKET WALL WITH LOWERED UPPER EDGE AND COMBINATION WITH CHECKOUT STAND

TECHNICAL FIELD OF THE INVENTION

This invention pertains to a shopping cart having a basket with side, bottom, and front walls fixed to one another. According to this invention, a central region of the front wall has an upper edge spaced substantially below the upper edges of the side walls. This invention also pertains to a combination of such a shopping cart and a checkout stand, wherein the upper edge of the central region is located approximately at the same elevation as a working surface of the checkout stand.

BACKGROUND OF THE INVENTION

As exemplified in Jones et al. U.S. Pat. No. 5,255,930, a shopping cart of a standard type in widespread use in retail establishments has a predominantly plastic or wire basket assembled or fabricated so that its side, bottom, and front walls are fixed to one another. Typically, as known heretofore, the upper edges of the side and front walls are coplanar. Usually, it is necessary for a customer or a clerk to lift merchandise from the basket, over the upper edge of one of the basket walls, onto the working surface of a checkout stand.

As exemplified in Adamson U.S. Pat. No. 5,385,358, a shopping cart of a different type in widespread use in retail establishments, a so-called over-the-counter cart, has a wire basket equipped with a front gate, which a clerk can open so as to facilitate unloading of merchandise from the basket onto the working surface of a checkout stand.

This invention has resulted from efforts to develop a hybrid cart having a basket that would not have a front gate but that would facilitate unloading of merchandise from the basket onto the working surface of a checkout stand.

SUMMARY OF THE INVENTION

This invention provides a shopping cart comprising a wheeled chassis, a handle structure, and a basket mounted to the wheeled chassis and to the handle structure. The basket has side, bottom, and front walls, which are fixed to one another. Each of the side and front walls has an upper edge. The upper edges of the side walls are parallel to each other. The front wall has a central region, which has an upper edge spaced substantially below the upper edges of the side walls, preferably at least several inches below the upper edges of the side walls.

Preferably, the front wall has two side regions, the central region being between the side regions. Preferably, moreover, each of the side regions has a stepped edge extending between the upper edge of one of the side walls and the upper edge of the central region.

This invention also provides a novel combination of a checkout stand supported by a floor and the shopping cart described above. The checkout stand has a working surface at a specific elevation above the floor. The wheeled chassis of the shopping cart is supported by the floor. Although the bottom wall is lower than the elevation of the working surface of the checkout stand, the upper edge of the central region of the front wall of the basket of the shopping cart is located approximately at the elevation of the working surface of the checkout stand.

These and other objects, features, and advantages of this invention are evident from the following description of a preferred embodiment of this invention with reference to the accompanying drawings.

BRIEF DESCRIPTION OF THE DRAWINGS

FIG. 2 shows a clerk unloading merchandise from the basket of the shopping cart, over the front wall of the basket, onto the working surface of the checkout stand.

DETAILED DESCRIPTION OF THE PREFERRED EMBODIMENT

Figure 1:
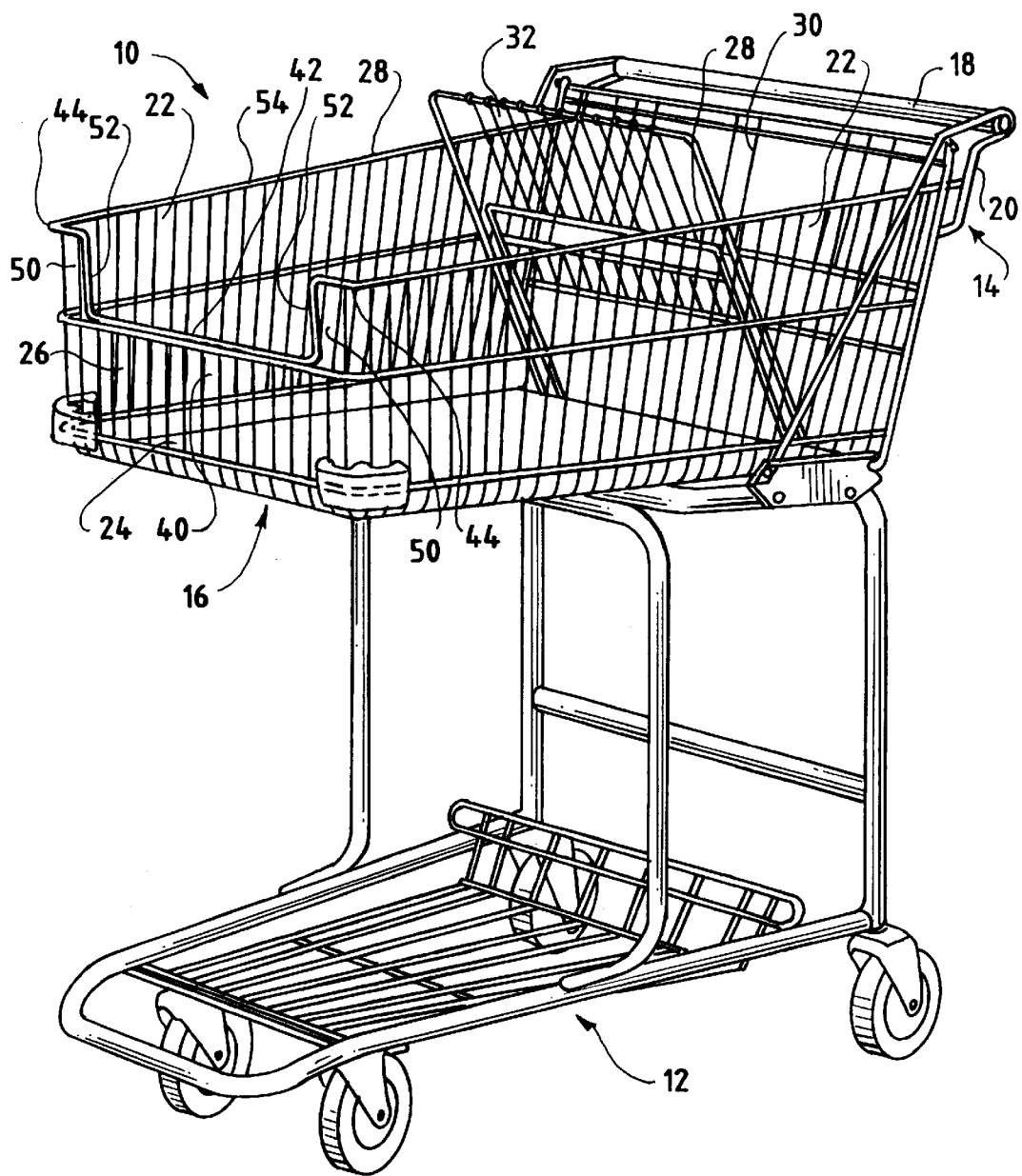
FIG. 1 is a perspective view of a shopping cart constituting a preferred embodiment of this invention. The upper edge of a central region of the front wall of the basket of the shopping cart is spaced at least several inches below the upper edges of the side walls of the basket.

As shown in the drawings, a shopping cart 10 constituting a preferred embodiment of this invention comprises a wheeled chassis 12, a handle structure 14, and a basket 16 mounted to the wheeled chassis 12 and the handle structure 14. The handle structure 14 includes a handle 18, which extends horizontally and laterally, and a handle mounting 20, which is made from welded steel wires, as shown, or from bent steel tubing. Except as illustrated and described, the shopping cart 10 is similar to shopping carts known heretofore and available commercially from Unarco Commercial Products of Wagoner, Okla.

The basket 16 has two side walls 22, a bottom wall 24, and a front wall 26. The side, bottom, and front walls 22, 24, 26, are fixed to one another. The upper edges 28 of the side walls 22 are parallel to each other and slope downwardly toward the front wall 26, so as to define a small angle (e.g. about 2°) with an imaginary, horizontal plane. Preferably, as shown, the side, bottom, and front walls 22, 24, 26, are made from welded steel wires in a conventional manner. Alternatively, the side, bottom, and front walls are made from molded plastic panels, as disclosed in Jones et al. U.S. Pat. No. 5,255,940. The basket 16 has a back wall 30, which is made from welded steel wires in a conventional manner. The back wall 30 mounts a child seat 32, which is conventional, and is mounted pivotally to the handle mounting 20 in a conventional manner.

As contemplated by this invention, the front wall 26 has a central region 40, which has an upper edge 42 spaced substantially below the upper edges of the side walls. Preferably, as shown, the upper edge 42 of the central region 40 of the front wall 26 is spaced at least several inches below the upper edges 28 of the side walls 22 and is spaced a greater distance above the bottom wall 24. Spacing from the upper edge 42 of the central region 40 of the front wall 26 to the upper edges 28 of the side walls 22 is measured from imaginary lines extending in opposite directions from the upper edge 42, to the upper edges 28, at the front corners 44 of the basket 16.

Preferably, as shown, the front wall 26 has two side regions 50, each meeting one of the side walls 22. The central region 40 is located between the side regions 50. Each of the side regions 50 has an upper, stepped edge 52, which extends between the upper edge 28 of one of the side walls 22 and the upper edge 42 of the central region 40. The front wall 26 also defines an open region between the stepped edges 52 of the side regions 50, above the upper edge 42 of the central region 40, the open region at all times being free of any structure of the shopping cart 10. As shown, the edges 28, 42, 52 are defined by a continuous wire.

Figure 2:
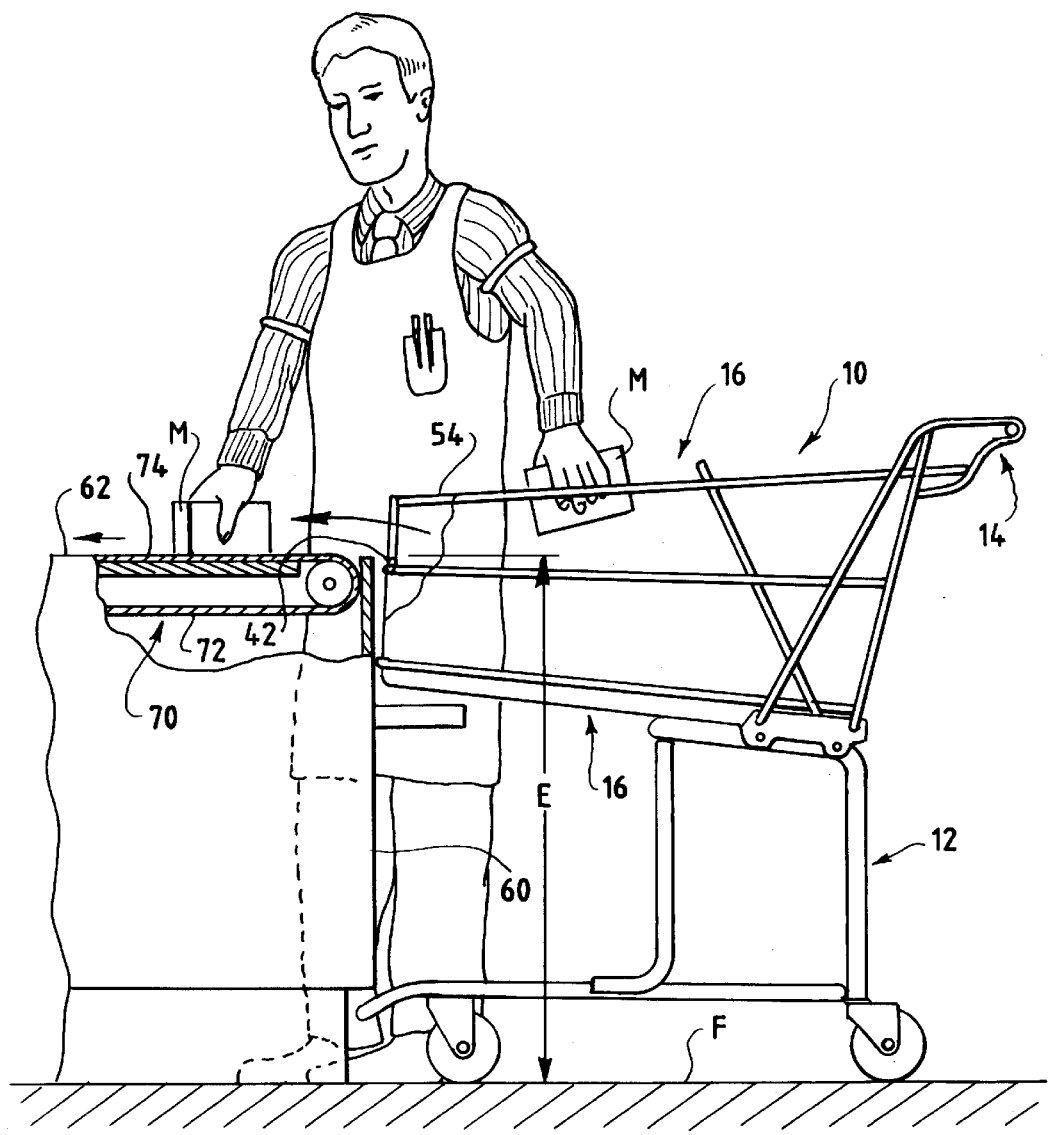
FIG. 2 is a simplified, partly fragmented, elevational view of the shopping cart combined and utilized with a checkout stand.

As shown in FIG. 2, the shopping cart 10 may be advantageously combined with a checkout stand 60, which has a working surface 62 at a specific elevation E above a floor F supporting the checkout stand 60 and the shopping cart 10 with the wheeled chassis 12 standing on the floor F, as shown, and onto which merchandise M unloaded from the basket 16 of the shopping cart 10 is placed. The checkout stand 60, which is known heretofore, is equipped with a conveyor 70 having an endless belt 72 with an upper run 74 at the working surface 62. Except that the working surface 62 is located at the specific elevation E above the floor F, details of the checkout stand 60 are outside the scope of this invention. It is contemplated by this invention that the upper edge 42 of the central region 40 of the front wall 26 of the basket 16 is located approximately at the same elevation E above the floor F.

When the shopping cart 10 is pushed up to the checkout stand 60 so that the front wall 26 of the basket 16 is near or against the checkout stand 60, there is no necessity for a person unloading merchandise M from the basket 16, over the central region 40 of the front wall 26, onto the working surface 62 of the checkout stand 60 to lift merchandise M more than minimally above the aforenoted elevation E. As compared to unloading of merchandise from the basket of a shopping cart (not shown) according to prior art, over the front wall of the basket, onto the working surface 62 of the checkout stand 60, unloading of merchandise M from the basket 16, over the central region 40 of the front wall 26, onto the working surface 62 of the checkout stand 60 requires less time and less effort.

Various modifications may be made in the preferred embodiment described above without departing from the scope and spirit of this invention.

I claim:

1. For use with a checkout stand having a working surface at a specific elevation above a floor, a shopping cart comprising a wheeled chassis, a handle structure, and a basket mounted to the wheeled chassis and to the handle structure so as to extend frontwardly from the handle structure, the basket having side, bottom, and front walls, which are fixed to one another, each of the side and front walls having an upper edge, the front wall having a central region, the central region having an upper edge spaced at least several inches below the upper edges of the side walls, the front wall being spaced frontwardly of the handle structure and having two side regions, the central region between the side regions, each of the side regions having a stepped edge extending between the upper edge of one of the side walls and the upper edge of the central region of the front panel, the upper edge of the central region being approximately at the elevation of the working surface of the checkout stand with the wheeled chassis standing on the floor, the front wall defining an open region between the stepped edges of the side regions, above the upper edge of the central region, the open region at all times being free of any structure of the shopping cart.

2. The shopping cart of claim 1 wherein the upper edges of the side walls, the stepped edges of the side regions of the front wall, and the upper edge of the central region of the front wall are continuous.

3. The shopping cart of claim 1 wherein the upper edges of the side walls, the stepped edges of the side regions of the front wall, and the upper edge of the central region of the front wall are defined by a continuous wire.

4. The shopping cart of claim 1 wherein the upper edge of the central region is spaced at least several inches below the upper edges of the side walls and a greater distance above the bottom wall.

5. The shopping cart of claim 1 wherein the side walls have equal heights where the side walls meet the side regions of the front wall.

6. A combination comprising a checkout stand supported by a floor, the checkout stand having a working surface at a specific elevation above the floor, and a shopping cart comprising a wheeled chassis standing on the floor, a handle structure, and a basket mounted to the wheeled chassis and to the handle structure so as to extend frontwardly from the handle structure, the basket having side, bottom, and front walls, which are fixed to one another, each of the side and front walls having an upper edge, the bottom wall being lower than the elevation of the working surface of the checkout stand, the front wall having a central region, the central region having an upper edge spaced at least several inches below the upper edges of the side walls and located approximately at the elevation of the working surface of the checkout stand, the front wall being spaced frontwardly of the handle structure and having two side regions, the central region between the side regions, each of the side regions having a stepped edge between the upper edge of one of the side walls and the upper edge of the central region of the front panel, the front wall defining an open region between the stepped edges of the side regions, above the upper edge of the central region, the open region at all times being free of any structure of the shopping cart.

7. The combination of claim 6 wherein the upper edges of the side walls, the stepped edges of the side regions of the front wall, and the upper edge of the central region of the front wall are continuous.

8. The combination of claim 6 wherein the upper edges of the side walls, the stepped edges of the side regions of the front wall, and the upper edge of the central region of the front wall are defined by a continuous wire.

9. The combination of claim 6 wherein the upper edge of the central region is spaced at least several inches below the upper edges of the side walls and a greater distance above the bottom wall.

* * * * *